United States Patent

Suzuki

[15] 3,671,524
[45] June 20, 1972

[54] TRIAZINYL-COUMARINS

[72] Inventor: Kazuaki Suzuki, Kawanishi, Japan

[73] Assignee: Showa Kagaku Kogyo Kabushiki Kaisha, Kawanishi, Japan

[22] Filed: Sept. 18, 1968

[21] Appl. No.: 760,667

[30] Foreign Application Priority Data

Sept. 20, 1967 Japan..................................42/59827
Sept. 20, 1967 Japan..................................42/59828
Nov. 4, 1967 Japan..................................42/72808

[52] U.S. Cl. ........................260/249.8, 252/301.2 R, 8/172, 260/249.5
[51] Int. Cl. .......................................................C07d 55/20
[58] Field of Search..............................................260/249.8

[56] References Cited

UNITED STATES PATENTS

| | | | |
|---|---|---|---|
| 3,242,177 | 3/1966 | Schellhanner et al...........260/249.8 X |
| 3,518,266 | 6/1970 | Hausermann et al. ..........260/249.8 X |
| 2,537,816 | 1/1951 | Dudley .....................................260/248 |
| 3,250,772 | 5/1966 | Dexter et al. ....................260/249.5 X |
| 2,945,033 | 7/1960 | Hausermann....................260/249.8 X |
| 3,184,459 | 5/1965 | Siegel et al......................260/249.8 X |

*Primary Examiner*—John M. Ford
*Attorney*—Wenderoth, Lind & Ponack

[57] ABSTRACT

A process for preparing a fluorescent whitening agent of the formula

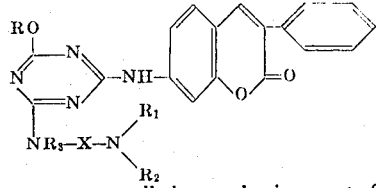

wherein R represents an alkyl group having one to four carbon atoms, each of $R_1$, $R_2$ and $R_3$ represents a hydrogen atom, or a lower alkyl group, and X represents a divalent organic residue such as lower alkylene group, hydroxy(lower)alkylene group or phenylene group, characterized by treating cyanuric chloride with an alcohol represented by the formula

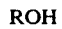

wherein R represents an alkyl group having one to four carbon atoms, in the presence of acid binding agent to form a compound represented by the formula

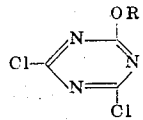

wherein R is the same as defined above, and subsequently treating the compound with 3-phenyl-7-aminocoumarin and an amine represented by the formula

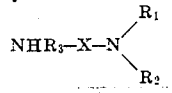

wherein $R_1$, $R_2$, $R_3$ and X are the same as defined above, in an optional order in an inert organic solvent or a mixed solution or dispersion of the inert organic solvent and water in the presence of acid binding agent.

1 Claim, No Drawings

TRIAZINYL-COUMARINS

The present invention relates to a novel process for preparing a fluorescent whitening agent comprising 7-triazinylamino-3-phenylcoumarin derivative and a method of fluorescent whitening organic materials, particularly synthetic high molecular materials using a fluorescent whitening agent thus obtained.

The present invention, in particular, relates to a novel process for preparing a fluorescent whitening agent comprising 7-triazinylamino-3-phenylcoumarin derivative represented by the formula

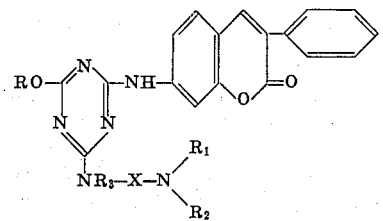

wherein R is an alkyl group having one to four carbon atoms; each of $R_1$, $R_2$ and $R_3$ is a hydrogen atom, or a lower alkyl with up to four carbon atoms; and X is a divalent organic residue such as substituted or unsubstituted alkylene, hydroxyalkylene, or phenylene group.

The fluorescent whitening agent of the present invention is a 7-triazinylamino-3-phenylcoumarin derivative having one

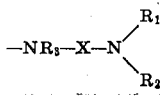

group which is basic and one alkoxy group in the triazine ring, which imparts an excellent fluorescent whitening action on various organic materials, particularly synthetic high molecular materials.

Various derivatives such as 7-triazinylamino-3-phenylcoumarin derivative and processes for preparation thereof have hitherto been proposed. Among these, a group of compounds represented by the formula (I) are prepared, for example, by a process which comprises reacting cyanuric chloride with 00-phenyl-7-aminocoumarin in a mixed solution of acetone and water to obtain a suspension of 7-[2,4-dichloro-1,3,5-triazinylamino-(6)]-3-phenylcoumarin, subsequently reacting diethylamine therewith to obtain 7-[2-diethylamino-4-chloro-1,3,5-triazinylamino-(6)]-3-phenylcoumarin, and, after separating and drying, acting on it with metallic sodium to obtain 7-[2-diethylamino-4-butoxy-1,3,5-triazinylamino-(6)]-3-phenylcoumarin.

The reactions are shown by the following chemical equations:

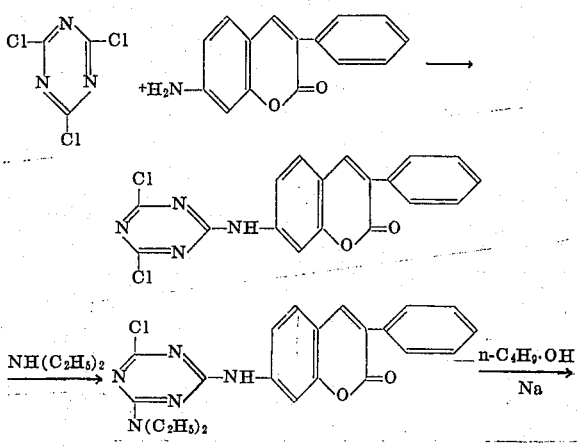

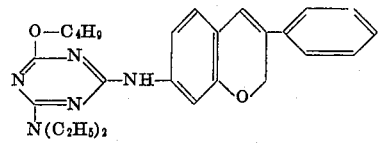

However, this process was not industrially satisfactory as a whole in that a large amount of inert organic solvent is required, further that, since, in the final step, sodium alkoxide obtained by utilizing metallic sodium is used, the intermediate product must once be separated, collected and dried, and that metallic sodium which is difficult to handle is used.

The present invention is a quite novel process which is free from the faults as described above and in which the whole steps can be easily and economically carried out. The present invention is a process for preparing compounds represented by the formula (I), which comprises treating cyanuric chloride in a lower aliphatic alcohol to form 2-alkoxy-4,6-dichloro-1,3,5-triazine, subsequently reacting it with 3-phenyl-7-aminocoumarin in an inert organic solvent or a mixed solution or suspension of an inert organic solvent and water to form 7-[2-alkoxy-4-chloro-1,3,5-triazinylamino(6)]-3-phenyl-coumarin, further reacting it with an amine represented by the formula

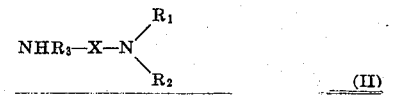

, wherein $R_1$, $R_2$ and $R_3$ and X are the same as defined in the formula (I) to obtain a compound represented by the formula (I), or which comprises first reacting 2-alkoxy-4,6-dichloro-1,3,5-triazine with an amine represented by the formula (II) in an inert organic solvent or a mixed solution or suspension of an inert organic solvent and water to obtain a compound represented by the formula

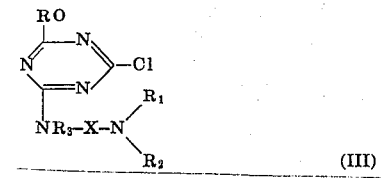

, and thereafter reacting it with 3-phenyl-7-aminocoumarin to obtain a compound represented by the formula (I).

The reaction of the present invention is shown by the following chemical equations:

(1) 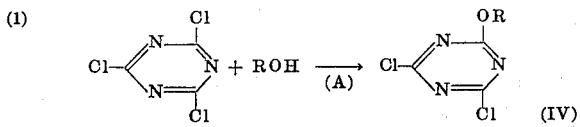

(2) 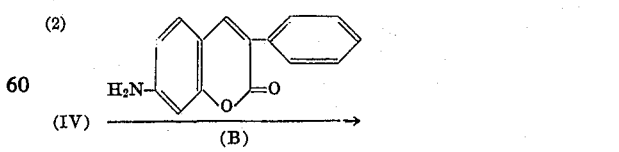

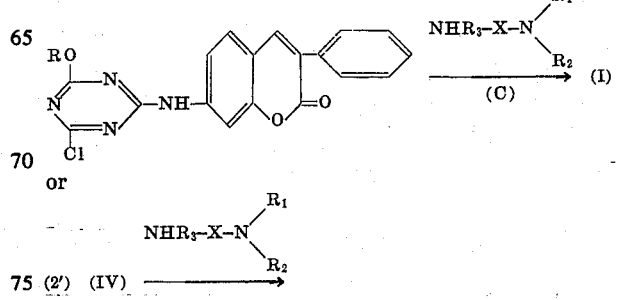

(2') (IV) ⟶

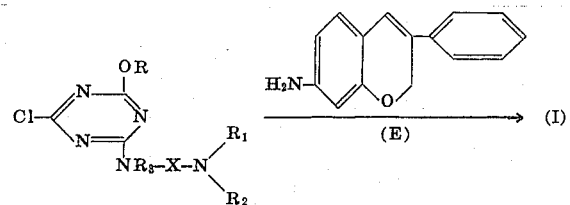

, wherein R, $R_1$, $R_2$, $R_3$ and X are the same as defined in the formula (I).

The reaction (A) can be carried out by reacting cyanuric chloride with a lower aliphatic alcohol having one to four carbon atoms such as methanol, ethanol, n-propanol, isopropanol, n-butanol, etc. in the presence of acid binding agent with itself as a solvent, or by using an inert organic solvent such as acetone.

The reactions (B) and (D) can be carried out in an inert organic solvent such as N,N-dimethylformamide, acetone, dioxane, ethyleneglycolmonomethyl ether, etc., and the reactions (C) and (E) can be carried out in the presence of acid binding agent in N,N-dimethylformamide, dioxane, ethylene glycol monomethyl ether, chlorobenzene, toluene, xylene, etc. Either reaction proceeds advantageously using N,N-dimethylformamide.

Amines represented by the formula (II) include, for example, N,N-dimethylethylenediamine, N,N-diethylethylenediamine, N,N-diethylpropylenediamine, N,N-diethyl-β-hydroxypropylenediamine, N,N-diethyl-para-phenylenediamine, etc.

Acid binding agents used in each of the reactions (A) to (E) include sodium bicarbonate, sodium carbonate, calcium carbonate, etc. In the reaction (A) the acid binding agent is advantageously present in excess. In the reactions (C) and (D) the amine itself of the formula (II) can act as an acid binding agent.

As the reaction temperature, the reaction (A) proceeds advantageously at relatively low temperature, the reactions (B) and (D) at intermediate temperature, and the reactions (C) and (E) at elevated temperature. However, the optimum temperature may be properly selected depending upon the kinds of alcohols or amines participating in the reaction and the length of reaction time.

The intermediate product (V) in the reaction (A) may be separated and collected; however, it is industrially advantageous to carry out subsequent reactions without separating and collecting it. Alcohols used in excess in the reaction can be removed and recovered in reaction (C) or (E), if necessary.

Typical compounds represented by the above described formula (I) include 7-[2-methoxy-4β-N,N-diethylaminoethylamino-1,3,5-triazinylamino(6)]-3-phenylcoumarin, 7-[2-methoxy-4γ-N,N-diethylaminopropylamino-1,3,5triazinylamino-(6)]3-phenylcoumarin, 7-2-ethoxy-4β-N,N-diethylaminoethylamino-1,3,5-triazinylamino-(6)]-3-phenylcoumarin, 7-[2-ethoxy-4γ-N,N-diethylaminopropylamino-1,3,5-triazinylamino-(6)]-3-phenylcoumarin, 7-[2-methoxy-4β-N,N-dimethylaminoethylamino-1,3,5-triazinylamino-(6)]-3-phenylcoumarin, 7-[2-methoxy-4 γ-N,N-diethylamino-β-hydroxypropylamino-1,3,5-triazinylamino-(6)]-3-phenylcoumarin, 7-[2-methoxy-4-p-N,N-diethylaminophenylamino-1,3,5-triazinylamino-(6)]-3-phenylcoumarin, 7-[2-n-propoxy-4γ-N,N-diethylaminopropylamino-1,3,5-triazinylamino(6)]-3-phenylcoumarin, and 7-[2-n-butoxy-4γ-N,N-diethylaminopropylamino-1,3,5-triazinylamino-(6)]-3-phenylcoumarin.

The compounds of the formula (I) obtained by the present invention can be used as fluorescent whitening agents for various organic materials, since the compounds are dissolved in an organic solvent to give a fluorescence of from blue to violet and have an affinity for these organic materials. And also the present compounds can optically whiten various organic materials, in particular, for example, resins and fibers of polyvinylchloride series, polyamide series, polyvinylalcohol series, polyacrylonitrile series and polyolefin series, synthetic resins of polyethylene, polystyrene, polymethacrylate ester, and the like, and synthetic high molecular materials such as cellulose fiber as well as natural organic material, for example, cellulose, etc., with the aid of surface active agent. The particularly excellent features of the compounds of the present invention are derived from the basicity shown by the tertiary nitrogen atom of

wherein $R_1$ and $R_2$ are the same as defined above, linking to the triazine ring by —($NR_3$—X—) group, wherein $R_3$ and X are the same as defined above, as a bridge, and exhibit an excellent adaptability and whitening ability for organic materials and impart an excellent fastness to light to the treated organic materials.

The features of the fluorescent whitening agent obtained according to the present invention, which is represented by the formula (I), will be hereinafter described more closely.

a. The present whitening agent is fast to steaming.

At present there are very few fluorescent whitening agents having a fastness to steaming, which are commercially available, and even if there are, they are very expensive. The fluorescent whitening agents of the present invention is very fast to steaming, can be cheaply manufactured, and can be used for textile printing.

b. The present fluorescent whitening agent can be used in combination with dispersion dyes to give a bright clear dyeing.

For example, fibers of the polyacrylonitrile series are usually dyed with a cation dye to give a clearly dyed product; however, in order to obtain a light-dyed product, dispersion dyes, such as, for example, Astrazone Blue BG, Diacryl Supra Red 2 BL, Diacryl Supra Brilliant Blue 2B, Dianix Fast Brilliant Yellow 4G Micro Disperse, Dianix Fast Blue RN Micro Disperse, Dianex Red S Micro Disperse, etc. are used.

These dispersion dyes can give a uniformly clearly dyed product in combination with the fluorescent whitening agent of the present invention although the dispersion dyes alone are difficult to give a uniformly clear dyeing.

c. The present fluorescent whitening agent has an affinity for various organic materials.

The fluorescent whitening agent of the present invention is very excellent in affinity and solubility for various organic materials. Therefore, in case the organic materials are synthetic high molecular materials, it is possible to brighten the above organic materials optically by adding and mixing the fluorescent whitening agent of the present invention thereto during and after syntheses of the materials. In this case the organic materials can be brightened optically by adding about 0.0001 to 0.5 percent by weight, preferably 0.001 to 0.05 percent, by weight, of the fluorescent whitening agent based on the organic materials thereto. And also, the fluorescent whitening agent does not interfere with the actions of catalysts, stabilizers, etc. which are usually employed in the syntheses of these synthetic high molecular materials, but also may be used in combination with pigments such as titanium oxide, etc.

Further, the fluorescent whitening agent of the present invention has an affinity not only for the synthetic high molecular materials but also for other organic materials, such as soap, and can be used therefore to brighten the same.

The fluorescent whitening agent obtained according to the process of the present invention, which is represented by the formula (I), is soluble in organic solvent as described above but is insoluble in water, and therefore the agent is usually used as an aqueous dispersion by utilizing a surface active agent. The organic materials are preferably treated in water as a medium, and in order to obtain an uniform treating effect it is desired to treat it with a homogeneous aqueous solution rather than with a dispersion.

According to the research of the present inventor it has been found that the compounds (I) obtained by the process of the present invention, can be solubilized in water without interfering with the action thereof as a fluorescent whitening agent. The details will be described below.

1. Water solubilization in the neutral state.

To the compound represented by the formula (I) is blended severalfold amount of granular sugar or sodium sulfate, and the blend is dissolved in hot water or in an aqueous solution of granular sugar or sodium sulfate. The solution so obtained does not precipitate the fluorescent whitening agent even on being cooled.

2. Method of dissolving in an aqueous solution of acidic substance.

The fluorescent whitening agent represented by the formula (I) is soluble in an aqueous solution of acidic substance selected from the group consisting of solid compounds derived from a strong inorganic acid, which is water soluble in acidic state, such as, for example, sulfuric acid, sodium bisulfite, etc., water soluble, solid aliphatic saturated or unsaturated polybasic acid or hydroxy acid, such as, for example, oxalic acid, malonic acid, maleic acid, succinic acid, tartaric acid, or citric acid, etc., formic acid and acetic acid, and organic materials can be treated with this solution to be given an uniform fastness to light and excellent fluorescent whitening effect.

3. Solubilization by quaternization

The compounds represented by the formula (I) are treated with $R_4Y$, wherein $R_4$ is an alkyl having 1 to 4 carbon atoms, and Y is a group forming a monovalent anion, in an insoluble organic solvent to obtain a compound represented by

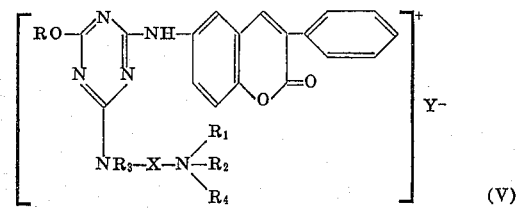

(V)

wherein R, $R_1$, $R_2$, $R_3$, $R_4$ and Y are the same as defined as above.

The compounds having the formula (I) are novel and their quaternary ammonium salts are water soluble and colorless or light yellow powder and have the same fluorescent whitening action as that of the above compounds represented by the formula (I). The compounds represented by the formula (V) are stable to sodium chlorite, and, therefore, the organic materials can be treated in a bath of sodium chlorite in case of carrying out fluorescent whitening thereof using the compounds represented by the formula (V).

In the above-mentioned, $R_4Y$, typically $R_4$ is a methyl group, an ethyl group, a propyl group, or a butyl group, and Y is

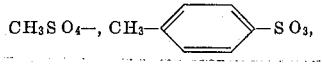

a halogen atom, etc.

According to the present invention, the compounds represented by the formula (I) can be dissolved in an organic solvent as they are to form a solution, or dispersed in water by using a surface active agent to form an aqueous dispersion, and the organic materials can be treated with the solution or dispersion to be fluorescently whitened.

And also, according to the present invention, the compounds represented by the formula (I) can be made to an aqueous solution according to the method (1) or (2) as described above, or made to a quaternary ammonium salt according to the above described method (3) and thereafter made to an aqueous solution, and then the organic materials can be treated with this aqueous solution to impart uniformly a fluorescent whitening effect of fastness to light thereto.

The fluorescent whitening agent of the present invention can give a fluorescent whitening effect to the organic materials not only by means of the above-mentioned treatment but also by merely mixing therewith, since the agent is soluble in the organic material and has an affinity thereto.

Next, the present invention will be described with examples; however, it is to be understood the present invention is not intended to be limited by the examples.

Examples 1 to 3 show processes for preparing the compounds represented by the formula (I) and a method of treating an organic material with the fluorescent whitening agent so obtained. Parts are by weight, unless otherwise indicated. Parts by weight bear the same relationship to parts by volume as do grams to milliliters. Dyestuff names are those of the Color Index.

EXAMPLE 1

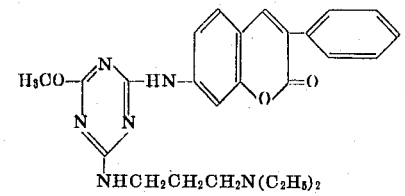

9.3 parts of cyanuric chloride, and 9.0 parts of sodium hydrogen carbonate were suspended in 50 parts of methanol, and the solution was stirred at about 10° C for 2 hours to obtain 2-methoxy-4,6-dichloro-1,3,5-triazine. To this suspension was added a solution of 11.8 parts of 3-phenyl-7-aminocoumarin in 100 parts of dimethylformamide over 30 minutes and was stirred at 25° to 30° C until the primary amino group is eliminated to obtain 7-[2-methoxy-4-chloro-1,3,5-triazinylamino-(6)]-3-phenylcoumarin as a light yellow slurry.

10 parts of N,N-diethyl propylene diamine was added to this slurry and the temperature was raised to about 50° C, and subsequently, the slurry was stirred at 80° to 90° C for 3 hours while most of the methanol was distilled out and stirred further at 110° – 120° C for 2 hours. After allowing to cool, the reaction mixture was poured into ice water and the precipitate produced was filtered and dried to obtain 21 to 23 parts of yellow powder of 7-[2-methoxy-4-γ-N,N-diethylaminopropylamino-1,3,5-triazinylamino-(6)]-3-phenylcoumarin which was then recrystallized from benzene-petroleum ether to obtain a light yellow powder melting at 184° to 185° C.

This compound is soluble in various organic solvents and the solution fluoresces a blue color.

And the compound is clearly dissolved in a dilute aqueous solution of acetic acid, etc. and its solution fluoresces a blue violet color.

Various organic materials, such as, for example, synthetic fibers of polyacrylonitrile, polyamide, polyvinyl chloride, cellulose acetate and polyvinyl alcohol could be optically whitened by immersing these fibers in this solution and heat treating them. This compound was excellent in fastness to light.

EXAMPLE 2

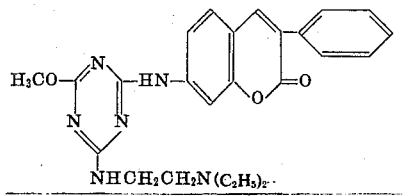

18.5 parts of syanuric chloride and 9.0 parts of sodium hydrogen carbonate were suspended in 50 parts of methanol, stirred at about 10° C for 2 hours, and poured into ice water, and then the precipitate produced was filtered off and dried under reduced pressure to obtain 2-methoxy-4,6-dichloro-1,3,5-triazine melting at 88° to 89° C as colorless crystals at a yield of 88 to 90 percent of the theoretical value. 9.0 parts of 2-methoxy-4,6-dichloro-1,3,5-triazine thus obtained was dissolved in 100 parts of dimethylformamide and 4.3 parts of sodium hydrogen carbonate was added thereto. And then 5.8 parts of N,N-diethylethylenediamine was added dropwise to this solution while stirring at ordinary temperature (15° to 30° C) for 30 minutes. After stirring the reaction solution at ordinary temperature, 11.8 parts of 3-phenyl-7-aminocoumarin and 4.2 parts of sodium hydrogen carbonate were added thereto and stirred at 80° to 90° C for 2 hours and then at 110° to 120° C until the primary amino group was eliminated. After filtering out sodium chloride produced, the solvent was concentrated and the residue was poured into ice water and then the precipitate produced was filtered off and dried to obtain 16 to 18 parts of 7-[2-methoxy-4-N,N-diethylaminoethylamino-1,3,5-triazinylamino-(6)]-3-phenylcoumarin melting at 195° C as a light yellow powder.

The compound fluoresced a blue to blueviolet color in various organic solvents depending upon the kinds of solvent similarly as the compound of Example 1 and could optically whiten various organic materials.

EXAMPLE 3

18.5 parts of cyanuric chloride and 18.0 parts of sodium hydrogen carbonate were suspended in 100 parts of ethanol and were stirred at about 10° C for 5 hours to obtain 2-ethoxy-4,6-dichloro-1,3,5-triazine as a slurry.

Next, 13.0 parts of N,N-diethylpropylenediamine was added to the slurry and after stirring it at room temperature, 23.7 parts of 3-phenyl-7-aminocoumarin dissolved in 200 parts of N,N-dimethylformamide were added thereto and further 7.2 parts of hydrogen sodium carbonate were added, and then while distilling out ethanol in the weak basic state, the reaction mixture was stirred for 2 to 3 hours and further at 110° to 120° C until the primary amino group was eliminated. After filtering out sodium chloride produced, the solvent was concentrated and the residue was poured into ice water and then the precipitate produced was filtered and dried to obtain 36.0 to 38.5 parts of 7-[2-ethoxy-4$\gamma$-N,N-diethylaminopropylamino-1,3,5-triazinylamino-(6)]-3-phenylcoumarin melting at 196° to 198° C as a light yellow powder.

This compound was dissolved in various organic solvents similarly as the compound of Example 1 and could fluoresce a blue color to optically whiten various organic materials.

In Example 3, when substituting N,N-diethylethylenediamine for N,N-diethylpropylenediamine, 7-[2-ethoxy-4$\beta$-N,N-diethylaminoethylamino-1,3,5-triazinylamino(6)]-3-phenylcoumarin was obtained as a fluorescent yellow powder which was then recrystallized from chlorobenzene to obtain a compound melting at 196° to 197° C. The compound was dissolved in various organic solvents similarly as the compound of Example 1 to fluoresce a blue color and could whiten optically various organic materials.

Examples 4 to 6 show fluorescent whitening of organic materials with the compound solubilized in the neutral state, which is represented by the formula (I).

EXAMPLE 4

0.1 part of 7-[2-methoxy-4$\gamma$-N,N-diethylaminopropylamino-1,3,5-triazinylamino-(6)]-3-phenylcoumarin obtained in Example 1 was dissolved in water containing 2.0 parts of granular sugar by heating and had added thereto 2.5 parts of non-ionic surface active agent and water up to 5,000 parts by volume of liquid.

100 parts of polyvinylalcohol fiber (commercially available as Vinylon) was immersed in this dyeing bath and treated at 90° C for 6 minutes, washed with water and dried to obtain a white colored fiber. In the same manner, nylon-6 and acetate fibers could be treated to optically brighten them.

EXAMPLE 5

To the dyeing bath prepared in the same manner as in Example 4, 2.0 parts of carrier CB-7 was added, and 100 parts of polyvinyl fiber commercially available as Tevilon was immersed therein and treated at 90° C for 60 minutes, washed with water and dried to obtain optically brightened polyvinyl fiber.

EXAMPLE 6

To the dyeing bath prepared in the same manner as in Example 4, 3.0 parts of a softener (commercially available e.g. as "Teflon perma A sol") was added, and 100 parts of acrylonitrile fiber commercially available as Nonnel was immersed in this bath at 60° C and the temperature was raised to 100° C in the course of 20 minutes. The fiber was treated at 100° C for 45 minutes in this bath and, after cooling to 70° C, was removed, washed with water, and dried to obtain acrylonitrile fiber which is well whitened and is excellent in handling.

EXAMPLE 7

The present example is an embodiment of steaming printing method.

Polyacrylonitrile fibers which were desized, scoured and dried were pad dyed in a 0.2 percent aqueous solution of 7-[2-ethoxy-4$\beta$-N,N-diethylaminoethylamino-1,3,5-triazinylamino-(6)]-3-phenylcoumarin obtained in the same manner as in Example 2, 0.5 percent of surface active agent and 9.0 parts of sodium sulfate, squeezed by a mangle by 100 percent and dried.

After drying the fibers were tentered at 130° C for 200 seconds and then printed with printing paste, steamed at 0.2 kg/cm² for 30 minutes by a steamer, washed with water and soaped.

The printed article so obtained was much whiter in its white portions and better in handling than in the case of using a conventional agent.

The same result was obtained when Example 7 was followed with the exception of substituting 7-[2-methoxy-4$\gamma$-N,N-dimethylaminopropylamino-2,3,5-triazinylamino-(6)]-3-phenylcoumarin, or 7-[2-methoxy-4$\gamma$-N,N-diethylaminopropylamino-1,3,5-triazinylamino-(6)]-3-phenylcoumarin for the fluorescent whitening agent used in the present Example.

And also the same result was obtained for blended spinning or combined weaving cloth of polyacrylonitrile fibers and other fibers.

Examples 8 and 9 show the cases of use in combination with dispersion dyes.

EXAMPLE 8

Composition of dyeing bath:

| | |
|---|---|
| 7-[2-methoxy-4$\gamma$-N,N-diethylamino-$\beta$-hydroxypropylamino-1,3,5-triazinylamino-(6)]-3-phenylcoumarin | 0.06% (owf) |
| Astrason blue — BG | 0.016% (owf) |
| Sodium sulfate | 0.50% (owf) |
| Surface active agent | 2.5% (owf) |
| Bath ratio | 1:5 |

Fibers of acrylonitrile (commercially available as "Exlan DK") were immersed in this dyeing bath at 60° C and the temperature of the bath was raised to 100° C for 30 minutes, and then at this temperature the fibers were treated for 60 minutes more. After the dyeing bath was cooled to about 70° C, the dyed article was removed, washed with water and dried. The article so treated had brighter blue color in comparison with that treated in the same manner except not using the fluorescent whitening agent.

The same result was obtained when Example 8 was followed with the exception of using Diacryl Spra Brilliant Blue 2B, or Diacryl Spra Red 2BL.

EXAMPLE 9

Composition of dyeing bath

| | |
|---|---|
| 7-[2-methoxy-4-$\gamma$-N,N-dibutylamino propylamino-1,3,5-triazinylamino-(6)]-3-phenylcoumarin | 0.05% (owf) |
| Dianix Red S Micro Disperse | 0.03% (owf) |
| Surface active agent | 0.5% (owf) |
| Carrier | 1.5% (owf) |
| Bath | 1:20 |

Fibers of acrylonitrile (commercially available as "Cashimilon") were immersed in this dyeing bath at 60° C and the temperature was raised to 100° C for 30 minutes, and then at this temperature the fibers were treated for 30 more minutes. After the dyeing bath was cooled to about 70° C, the dyed article was removed, washed with water, and dried. The article so treated had brighter scarlet color in comparison with the same material treated in the same manner except not using the fluorescent whitening agent.

The similar bright color dyed article was obtained when Example 9 was followed with the exception of using Dianix Fast Brilliant Yellow 4G Micro Disperse, or Dianix Fast Blue RN Micro Disperse.

EXAMPLE 10

The present Example shows the case of directly blending the fluorescent whitening agent to the organic materials. 1 part of 7-[2-butoxy-4γ-N,N-diethylaminopropylamino-1,3,5-triazinylamino-(6)]-3-phenylcoumarin was blended to 100 parts of rolled film made by polyvinyl chloride containing conventionally used softener and 10 parts of $TiO_2$ as a white pigment. The rolled film thus obtained showed beautiful white color excellently fast to light.

Examples 11 to 16 show cases of treating the organic materials with an aqueous solution of acidic substance having a fluorescent whitening agent (I) dissolved therein.

EXAMPLE 11

0.1 part of fluorescent whitening agent, 7-[2-methoxy-4γ-N,N-diethylaminopropylamino-1,3,5-triazinylamino-(6)]-3-phenylcoumarin obtained in Example 1 was dissolved in 10 parts of 0.5 percent acetic acid aqueous solution and 25 parts of non-ionic active agent and water were added thereto up to 5,000 parts by volume in total liquid amount.

100 parts of synthetic fibers of polyacrylonitrile commercially available as "Exlan D" was immersed in this dyeing bath at 60° C, heated to the boiling point for 20 minutes under well stirring, and was treated for 30 minutes at the said temperature. When the dyeing bath was cooled to about 70° C, the dyed cloth was removed, washed with water, and dried. The article obtained was very white in appearance, being very fast to light.

EXAMPLE 12

0.1 part of fluorescent whitening agent (the same material as used in Example 11) and 0.5 part of sodium bisulfite were dissolved in several-fold amount of hot water, and 2.5 parts of non-ionic active agent, 5.0 parts of sodium chlorite and water were added thereto up to 5,000 parts by volume in total liquid amount.

100 parts of synthetic fibers of polyacrylonitrile commercially available as "Exlan D" was immersed in this dyeing bath about 60° C, heated to the boiling point for 20 minutes under well stirring, and at this temperature was treated for 30 minutes.

When the dyeing bath was cooled to about 70° C, the dyed fibers were washed with water, and further were treated with 5 percent by weight of sodium bisulfite or hydrogen peroxide based on the weight of fibers at a bath ratio of 20 to 1 : 50 at the temperature of 70° C, and after washing with water were dried. The fibers treated were very white in appearance in comparison with the untreated fiber.

And also the fibers were of whiter appearance than those without using sodium chlorite in Example 11.

EXAMPLE 13

0.1 part of fluorescent whitening agent 7-[2-methoxy-4β-N,N-diethylaminoethylamino-1,3,5-triazinylamino-(6)]-3-phenylcoumarin obtained in Example 2 and 0.3 part of oxalic acid were dissolved in hot water and 2.5 parts of non-ionic active agent and water were added thereto up to 5,000 parts by volume in total liquid amount.

100 parts of synthetic fibers of polyacrylonitrile commercially available as Cashimilon were immersed in this bath at 60° C, were heated to the boiling point for 20 minutes while stirring well, and at this temperature were treated for 30 minutes.

When the dyeing bath was cooled to about 70° C, the dyed article was removed and, after washing with water, was dried.

The article obtained was much whiter in appearance than an untreated one.

In the same manner the synthetic fibers of polyacrylonitrile could also be fluorescently whitened using the following compounds: 7-[2-methoxy-4β-N,N-dimethylaminoethylamino-1,3,5-triazinylamino-(6)]-3-phenylcoumarin, 7-[2-methoxy-4 γ-N,N-diethylamino-α-hydroxypropylamino-1,3,5-triazinylamino-(6-]-3-phenylcoumarin, and 7-[2-methoxy-4-p-N,N-diethylaminophenylamino-1,3,5-triazinylamino-(6)]-3-phenylcoumarin.

EXAMPLE 14

0.1 part of fluorescent whitening agent, 7-[2-ethoxy-4β-N,N-diethylaminoethylamino-1,3,5-triazinylamino-(6)]-3-phenylcoumarin and 0.5 part of sulfonic acid were dissolved in hot water, and 2.5 parts of non-ionic active agent and water were added thereto up to 5,000 parts by volume in total liquid amount.

100 parts of synthetic fibers of polyacrylonitrile commercially available as Nonnel were immersed in the dyeing bath at about 70° C, heated to the boiling point for 20 minutes while stirring well, and at this temperature were treated for 30 minutes.

When the dyeing bath was cooled to about 70° C, the dyed article was removed, washed with water, and dried. The article obtained was whiter in appearance than untreated one. In the same manner, the synthetic fibers of polyacrylonitrile could also be fluorescently whitened using the following compounds: 7-[2-n-propoxy-4β-N,N-diethylaminoethylamino-1,3,5-triazinylamino-(6)]-3-phenylcoumarin, and 7-[2-n-butoxy-4γ-N,N-diethylaminopropylamino-1,3,5-triazinylamino-(6)]3-phenylcoumarin.

EXAMPLE 15

0.1 part of fluorescent whitening agent, 7-[2-ethoxy-4γ-N,N-diethylaminopropylamino-1,3,5-triazinylamino-(6-]-3-phenylcoumarin was dissolved in a small amount of water containing 2.5 parts of 48 percent acetic acid, and 2.5 parts of nonionic active agent, 5.0 parts of sodium chlorite and water were added thereto up to 5,000 parts by volume in total liquid amount.

100 parts of synthetic fibers of polyacrylonitrile commercially available as "Beslon" were immersed in the dyeing bath at about 60° C, heated to the boiling point for 20 minutes while stirring well, and at this temperature was treated for 30 minutes. When the dyeing bath was cooled to about 70° C, the dyed article was removed, and, after washing with water, was treated in 3,000 parts of aqueous solution containing 3.0 parts of sodium bisulfite at 70° C for 20 minutes. After washing with water and drying, the obtained article was very white in appearance in comparison with untreated one.

EXAMPLE 16

0.1 part of fluorescent whitening agent (the same material as used in Example 11) and 0.3 part of sulfonic acid were dissolved in hot water, and 2.5 parts of non-ionic active agent and water were added thereto up to 5,000 parts by volume in total liquid amount.

100 parts of fibers of cellulose acetate were immersed in the dyeing bath and were treated at 25° C for 30 minutes. After washing with water and drying, the obtained article was whiter in appearance in comparison with the untreated one.

In the same manner, synthetic fibers of polyamide, for example, "nylon," polyvinyl chloride, for example "Tevilon," and polyvinyl alcohol, for example "Vinylon," etc. could be optically whitened.

The same results were obtained by substituting cation active agent for the non-ionic active agent used in Examples 11 to 16.

Examples 17 to 21 show processes for preparing the fluorescent whitening agent quaternized shown by formula (V) and the cases of fluorescently whitening organic materials therewith.

EXAMPLE 17

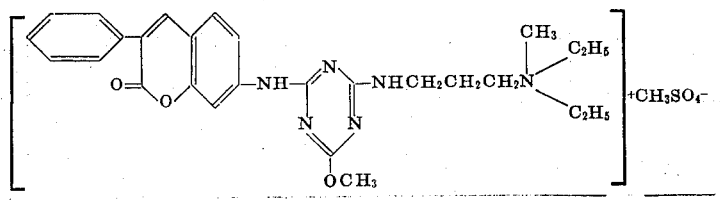

4.7 parts of 7-[2-methoxy-4γ-N,N-diethylaminopropylamino-1,3,5-triazinylamino-(6)]-3-phenylcoumarin was dissolved in 80 parts of benzene by heating it, and 1.5 parts of dimethyl sulfate was added and was heated under reflux for 4 hours to settle an oily material.

Benzene was removed by decantation at elevated temperature, and the residue was washed with acetone. After adding acetone and allowing to stand, the precipitate was filtered and dried to obtain 5.5 parts of ammonium salt represented by the above formula as a light yellow powder, which was then recrystallized from methanol to obtain a bright light yellow powder melting at 212° C. 0.1 part of the thus-obtained compound was dissolved in 5,000 parts of water, and 50 parts of sodium chlorite and 2.5 parts of non-ionic active agent were added thereto, and further pH was adjusted to 3 to 4 with acetic acid.

100 parts of cloth of polyacrylonitrile fiber ("Exlan") was immersed in the bath at 60° C, was heated to 95° to 100° C while stirring well for 20 minutes and treatment was continued at this temperature for 30 minutes.

When the temperature of the bath was cooled to about 70° C after allowing to cool, the dyed article was removed, and after washing with water, was treated in 5,000 parts of aqueous solution containing 5.0 parts of sodium bisulfite at 70° C for 10 minutes. The article which was washed with water and dried was very white in appearance in comparison with an untreated one, and the whiteness thereof was very fast to carbon-arc light of discolor testing machine and to sunlight.

EXAMPLE 18

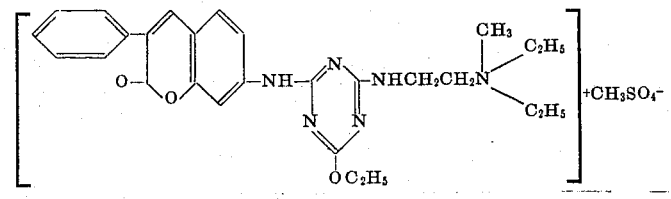

4.7 parts of 7-[2-ethoxy-4β-N,N-diethylaminoethylamino-1,3,5-triazinylamino-(6)]-3-phenylcoumarin was dissolved in 150 parts of chlorobenzene by heating and 1.5 parts of dimethyl sulfate was added thereto and was heated and boiled under reflux on an oil bath for 4 hours to settle an oily material.

After flowing out monochlorobenzene by decantation at elevated temperature, the oily material was washed with a small amount of benzene and was dissolved in alcohol, and then water was added thereto to reprecipitate the product which was then cooled, filtered and dried to obtain 5.0 parts of the salt represented by the above-described formula, as a light yellow powder. The product melted at above 220° C with partial decomposition. 0.2 part of salt so obtained was dissolved in 5,000 parts of water. 100 parts of fiber cloth of cellulose acetate commercially available as Aron) was immersed in the bath and maintained at 75° to 80° C for 1 hour, while the cloth was stirred in the bath. After cooling, the dyed cloth was removed, washed with water and dried. The cloth so treated was a very beautiful white in appearance in comparison with untreated one.

Similarly, polyamide fiber (for example, nylon), polyvinylchloride fiber (for example, Tevilon), and polyvinylalcohol fiber (for example, Vinylon) could be treated to be optically whitened.

EXAMPLE 19

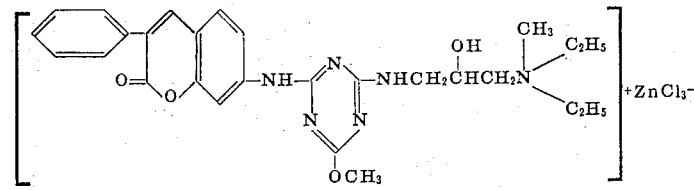

4.8 parts of 7-[2-methoxy-4γ-N,N-diethylamino-β-hydroxypropylamino-1,3,5-triazinylamino-(6)]-3-phenylcoumarin was dissolved in 150 parts of monochlorobenzene by heating and 1.5 parts of dimethyl sulfate was added thereto, and was heated and boiled under reflux for 4 hours to settle an oily material.

After removing monochlorobenzene by decantation at elevated temperature, the residue was washed with acetone and then was dissolved in 200 parts of hot water, and a small amount of active carbon was added thereto and was filtered.

Zinc chloride and calcium chloride were added to the filtrate, which was cooled to precipitate an ammonium salt represented by the above formula as zinc chloride double salt, which was then filtered off and dried to obtain a light yellow powder.

Example 18 was repeated with the exception of using the salt and the same result as in Example 18 was obtained.

EXAMPLE 20

0.1 l part of quaternary ammonium salt of 7-triazinylamino-3-phenylcoumarin represented by the formula

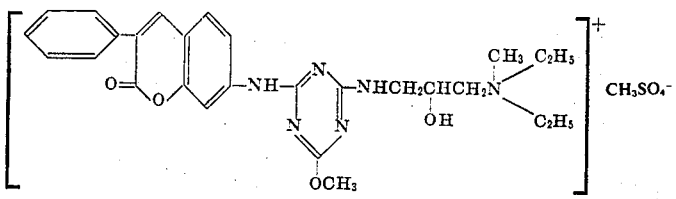

was dissolved in 5,000 parts of water, and 10 parts of sodium chlorite and 2.5 parts of non-ionic active agent were added thereto, and then the solution was adjusted pH to 2 to 4 with formic acid. 100 parts of cloth of polyacrylonitrile fiber (commercially available as "Trelon") was immersed in the bath at 60° C, and was heated to 95° to 100° C for 20 minutes while stirring well, and at this temperature was treated for 30 minutes and then aftertreated in the same manner as in Example 1. The obtained article was very white in appearance in comparison with an untreated one.

EXAMPLE 21

0.2 part of quaternary ammonium salt of 7-triazinylamino-3-phenylcoumarin represented by the formula

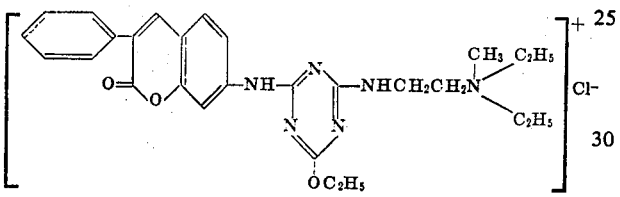

was dissolved in 5,000 parts of water and was adjusted to pH 4 with acetic acid, 100 parts of cloth of polyvinylchloride fiber (commercially available as "Tevilon") was immersed in the bath previously warmed and was treated at 85° to 90° C for 1 hour, and the cloth was after-stirred in the bath.

After allowing to cool, the cloth was washed with water. The cloth so treated was very beautiful white in appearance in comparison with an untreated one.

Cloth of polyamide fiber (for example, nylon) treated in the same manner fluoresces under ultraviolet light.

What is claimed is:

1. A compound of the formula

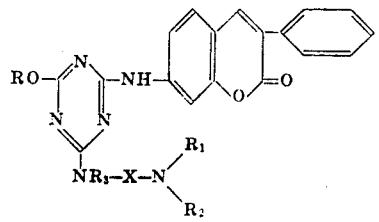

wherein R is an alkyl group of from 1 to 4 carbon atoms, each of $R_1$, $R_2$ and $R_3$ is a hydrogen atom or lower alkyl group of up to 4 carbon atoms and X is a divalent organic residue selected from the group consisting of lower alkylene, hydroxy(lower)alkylene and phenylene.

* * * * *